United States Patent [19]

Heemskerk

[11] 4,286,829
[45] Sep. 1, 1981

[54] BEARING FOR HIGH ROTATIONAL SPEEDS

[75] Inventor: Rutgerus S. Heemskerk, Vianen, Netherlands

[73] Assignee: SKF Industrial Trading & Development Co. B. V., Nieuwegein, Netherlands

[21] Appl. No.: 79,837

[22] Filed: Sep. 28, 1979

[30] Foreign Application Priority Data

Oct. 2, 1978 [NL] Netherlands ............................ 7809912

[51] Int. Cl.³ ............................ F16C 1/24; F16C 33/78
[52] U.S. Cl. ...................................... 308/187; 308/188
[58] Field of Search ..................... 308/187, 187.1, 36.1, 308/36.4, 188, 189 R, 187.2

[56] References Cited

U.S. PATENT DOCUMENTS

| | | | |
|---|---|---|---|
| 3,645,592 | 2/1972 | Flandrena | 308/187 |
| 3,804,476 | 4/1974 | Nakamura et al. | 308/187 |
| 4,103,759 | 8/1978 | Erich et al. | 308/187 |

Primary Examiner—Lenard A. Footland
Attorney, Agent, or Firm—Eugene E. Renz, Jr.

[57] ABSTRACT

A system for lubricating a bearing adapted for high rotational speed comprising a stationary and a rotatable race ring and a plurality of rolling elements guided by a cage in the annular space between the rings. The lubricating system for supplying lubricant to the races of the bearing comprises a ring made of a porous material fixed adjacent at least one axial end of the stationary race, an annular lubricant source located adjacent the porous ring which extends into the region of the running surface of the rotating race whereby the lubricant under the influence of negative pressure generated by high rotation is drawn from the lubricant reservoir through the porous ring, circulated through the bearing raceways and rolling elements and returned to the porous ring along the running surface of the stationary race ring.

11 Claims, 1 Drawing Figure

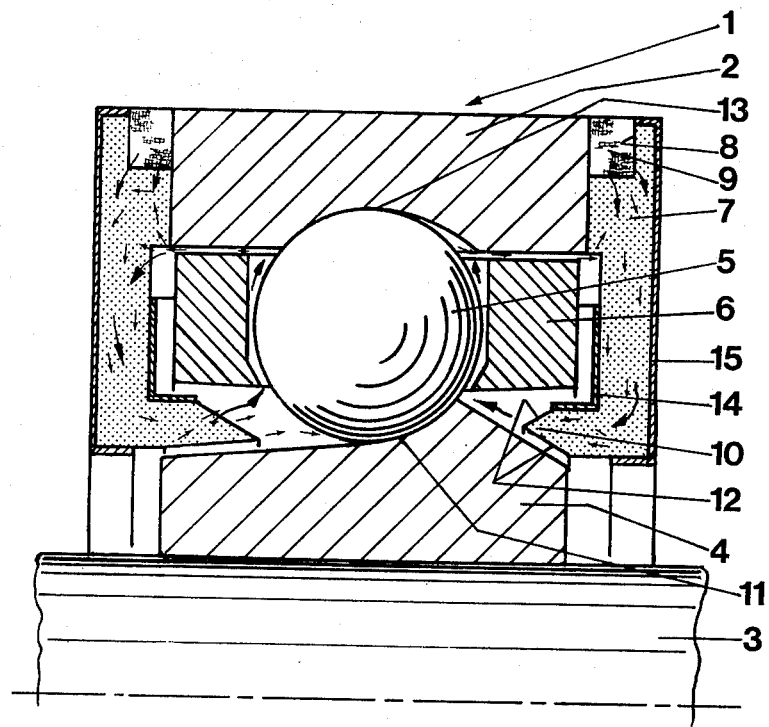

BEARING FOR HIGH ROTATIONAL SPEEDS

BACKGROUND OF THE INVENTION AND SUMMARY OF THE PRESENT INVENTION

The invention relates to a bearing for high rotational speeds, consisting of a stationary and a rotatable race ring in between rolling elements placed in a cage, and a lubricating means for supplying lubricant to the races of the bearing.

In known high speed running bearing assemblies the lubricating means is provided with a pump to secure a desired pressure of the lubricant. Besides, this necessitates a comparatively complicated circulating, filtering and pressure regulating system, whereby the construction of the bearing is rendered additionally costly and difficult.

The object of the invention is to provide a bearing of the kind mentioned in the preamble, in which the stated disadvantages are avoided and which moreover is simple in design and effective in operation.

According to the invention, the bearing is characterized in that at least on one side of said stationary race, a ring made of porous material is fixed, adjoined by a source of lubricant an end part thereof extending into the vicinity of the running surface of the rotating race, such that the lubricant, under the influence of the negative pressure generated by high rotation being drawn out from said end part and moved from the said part, mainly in radial direction to the said stationary race ring and returned to the porous ring once more along the running surface of said stationary race ring.

The negative pressure at the rotating race is induced by the centrifugal force generated in rotation, whereby the lubricant is drawn out of the porous ring to the races to be lubricated; a lubricant pump with regulating systems is thus superfluous. Because the running surface of the stationary race returns the lubricant to the porous ring, a circulation of lubricant is set up through the porous ring and the bearing, whereby the lubricant is continually replenished on the parts to be lubricated, and the service life of the bearing is considerably prolonged. A contributory effect to this is that dirt particles are retained in the porous ring and thus removed from the lubricant, so that the bearing is actually lubricated at all times by lubricant of optimum quality.

It is noted that Netherlands Patent Application 7,304,414 discloses a bearing for low speeds, provided with a lubricating means in which no pump is used likewise. Here use is made of a grease compound from which the lubricant is released in rotation by centrifugal force. The rotational speed, however, is comparatively low, in this case about 660 revolutions per minutes, inasmuch as the grease compound is unable to flow. The invention, by contrast, relates to a bearing for very high rotational speeds, for example over 15,000 revolutions per minute, so that the prior art lubricating system suitable for low rotational speeds cannot be employed.

Preferably, according to the invention, a porous ring or plate is fixed on opposed sides of the stationary race provided with an end part which is close to said rolling elements and rotatable race ring, at least has no contact with these bearing parts.

An especially simple design is achieved when the source of lubricant consists of an absorbent ring or similar member saturated with lubricant and arranged in a recess formed in the (each) porous ring and adjoining the stationary race.

According to an advantageous embodiment of the invention, a sealing ring is arranged on the inner side of the (each) porous ring, extending into the vicinity of the stationary race, thus achieving a favorable circulation of the lubricant.

DESCRIPTION OF THE DRAWING

The invention will now be explained with reference to the drawing, schematically showing an embodiment by way of example.

DESCRIPTION OF A PREFERRED EMBODIMENT

The bearing 1 is provided with a stationary outer race 2 and an inner race 4 fixed on a shaft 3 rotating at high speed. Between the outer race 2 and the inner race 4, a plurality of rolling elements 5 are retained in a cage 6. Only one rolling element 5 is shown in the drawing, in this case in the form of a ball. Of course, other kinds of rolling elements, such as a symmetrical or asymmetrical roller, a cylinder or a tapered roller, may be used as well.

To the outer race 2, on opposed sides thereof, a preferably flat ring 7 is fixed, made of a porous, for example sintered, material. In the porous ring 7, a recess 8 is formed, adjoining the outer race 2, in which recess a ring 9 of lubricant-absorbing material, preferably felt, is arranged. The ring 9 is saturated with a lubricant and serves as source of lubricant. The porous ring 7, beside the inner race 4, has a portion 10 directed inward, tapering to a point in the vicinity of the running surface 11 of the inner race 4.

The centrifugal forces arising at the high-speed rotation of the bearing cause a negative pressure at the inner race 4, drawing out the lubricant so that it emerges from the V-shaped boundary surface 12 of the portion 10. The lubricant is then supplied between cage 6, ball 5 and surface 13 of the outer race 2, i.e. in radial direction, to the porous ring 7, so that a circulation of lubricant is set up as indicated by arrows. Thus the lubricant is efficiently replenished continually considerably prolonging the service life of the bearing 1. Furthermore, any dirt particles are removed from the lubricant in the porous ring 7, ensuring good quality of the lubricant for a long time.

On the inside of the porous ring 7, a sealing ring 14 is arranged, leaving clear only a small portion of the inside of the porous ring 7, thereby achieving an effective circulation of lubricant. On the outside of the porous ring 7 likewise, a sealing ring or plate 15 is arranged, partially enclosing the ring 7. Alternatively, the porous ring 7 may be provided with a protective sealing layer on the outside. Owing to the strong suction generated at high rotational speeds, such a protective layer, or the sealing ring 15, may be dispensed with if desired. It will be apparent, however, that to avoid lubricant loss, if a lubricating means according to the invention is employed on one side of the bearing, there must at least be a seal on the other side of the bearing to keep the lubricant from leaking away in the course of time.

The invention is by no means limited to the embodiment described above by way of example, which may be modified in various ways within the scope of the invention.

I claim:

1. A bearing for high rotational speeds, comprising a stationary and a rotatable race ring, a plurality of rolling elements in the annular space between the rings, a cage for spacing the rolling elements, and a lubricating system to supply lubricant to the raceways of the bearing, characterized by a ring made of a porous material fixed in at least one end part of said stationary ring adjoined by a source of lubricant, a part of said ring of porous material extending into the vicinity of the running surface of the rotating raceway such that the lubricant, under the influence of negative pressure generated by high rotation, is drawn out from said end part and moved from said part in a direction to the said stationary race ring and returned to the porous ring once more on the running surfaces of said stationary race ring, and a recess formed in the porous ring and adjoining the stationary race defining a reservoir for lubricant.

2. Bearing according to claim 1, characterized in that the (each) porous ring has a portion directed inward on the side of the rotating race, the terminal surface whereof extends near the running surface of one race.

3. Bearing according to claim 2, characterized in that the portion directed inward tapers to a point.

4. Bearing according to claim 1, characterized in that, on the inner side of the (each) porous ring, a sealing ring is arranged, extending into the vicinity of the stationary race.

5. Bearing according to claim 1, characterized in that a sealing layer, at least for the lubricant, is arranged on the inner side of the (each) porous ring, which layer extends close to the stationary race.

6. Bearing according to claim 1, characterized in that, on the outer side of the (each) porous ring, a sealing ring or plate is arranged, partially enclosing the porous ring.

7. Bearing according to claim 1, characterized in that the (each) porous ring is provided on the outerside with a protective layer sealing it against the lubricant.

8. Bearing according to claim 1, characterized in that the (each) porous ring is made of sintered material.

9. A bearing according to claim 1 including a porous plate fixed on opposite sides of said stationary race, each ring having an end part close to said rolling elements and rotatable race ring.

10. A bearing for high rotational speeds, comprising a stationary and a rotatable race ring, a plurality of rolling elements in the annular space between the rings, a cage for spacing the rolling elements, and a lubricating system to supply lubricant to the raceways of the bearing, characterized by a ring made of a porous material fixed in at least one end part of said stationary ring adjoined by a source of lubricant, a part of said ring of porous material extending into the vicinity of the running surface of the rotating raceway such that the lubricant, under the influence of negative pressure generated by high rotation, is drawn out from said end part and moved from said part in a direction to the said stationary race ring and returned to the porous ring once more on the running surfaces of said stationary race ring, and a recess formed in the porous ring and adjoining the stationary race defining a reservoir for lubricant, said source of lubricant consisting of an absorbent ring saturated with a lubricant and arranged in said recess and adjoining the stationary race.

11. Bearing according to claim 10, characterized in that the absorbent ring consists of felt.

* * * * *